(12) United States Patent
Hoyt

(10) Patent No.: US 7,954,654 B1
(45) Date of Patent: Jun. 7, 2011

(54) BOW CADDY

(76) Inventor: Karl Hoyt, St. Maries, ID (US)

( * ) Notice: Subject to any disclaimer, the term of this patent is extended or adjusted under 35 U.S.C. 154(b) by 383 days.

(21) Appl. No.: 12/037,460

(22) Filed: Feb. 26, 2008

Related U.S. Application Data

(60) Provisional application No. 60/891,640, filed on Feb. 26, 2007.

(51) Int. Cl.
*A47F 7/00* (2006.01)
(52) U.S. Cl. ....... 211/85.7; 211/60.1; 224/275; 224/560
(58) Field of Classification Search ................ 211/85.7, 211/13, 60.1, 106.01; 224/275, 560, 561, 224/568, 571; 206/315.1, 315.11; 124/23.1, 124/24.1, 86; 108/44, 152; 248/166, 15
See application file for complete search history.

(56) References Cited

U.S. PATENT DOCUMENTS

| | | | | | |
|---|---|---|---|---|---|
| 1,140,730 | A | * | 5/1915 | Wolfert | ........................ 297/256 |
| 1,299,827 | A | * | 4/1919 | Edwards | ...................... 297/255 |
| 2,100,261 | A | * | 11/1937 | Montgomery | ................ 224/275 |
| 2,672,988 | A | * | 3/1954 | Johnson | ..................... 211/88.01 |
| 2,822,968 | A | * | 2/1958 | Jackson | ........................ 224/275 |
| 3,477,586 | A | | 11/1967 | Haluska | |
| 3,556,589 | A | * | 1/1971 | Messier | ................... 297/230.12 |
| 3,584,820 | A | * | 6/1971 | Butcher, Sr. | ............... 248/122.1 |
| 4,073,328 | A | * | 2/1978 | Franklin | ................. 206/315.11 |
| 4,360,179 | A | | 11/1982 | Roberts | |
| 4,474,296 | A | * | 10/1984 | Hartman | ...................... 211/85.7 |
| 4,696,461 | A | * | 9/1987 | Zelinski | ......................... 269/16 |
| 4,944,434 | A | * | 7/1990 | Hamilton | ..................... 224/549 |
| 6,244,556 | B1 | | 6/2001 | Carillo et al. | |
| 6,450,378 | B1 | | 9/2002 | Miller | |
| 6,457,685 | B1 | * | 10/2002 | Taylor | .......................... 248/166 |
| 6,712,248 | B2 | | 3/2004 | Mitchell | |
| 6,986,446 | B2 | * | 1/2006 | Murray et al. | ............... 224/275 |
| 2005/0178938 | A1 | | 8/2005 | Sutherland | |

* cited by examiner

*Primary Examiner* — Korie Chan
(74) *Attorney, Agent, or Firm* — Bert P. Krages, II

(57) ABSTRACT

A collapsible bow holder that fits over the back of a car or truck seat to facilitate the ready access to a bow in the event that a sportsman wants to deploy it in a nearly immediate manner. The bow holder allows for one or more bows to be securely stored within a vehicle along with arrows, maps, and other accessories. When not in use, the bow holder can be collapsed to a flat shape that is easily stored within a vehicle.

9 Claims, 2 Drawing Sheets

BOW CADDY

CROSS-REFERENCED TO RELATED APPLICATIONS

This application claims the benefit of provisional application 60/891,640 which was filed on Feb. 26, 2007.

FEDERALLY SPONSORED RESEARCH

No

BACKGROUND OF THE INVENTION

This invention relates to the field of racks for supporting bows, specifically to a caddy for supporting a bow on a car or truck seat. Archery and bow hunting are recreational sports which employ bows such as the compound bows that are well known in the prior art. Sportsmen commonly use motor vehicles such as cars and trucks as transportation to and from the places where they intend to used a bow. Proper storage of bows is desired because they can be damaged if allowed to collide with other material or to bang around within the confines of a vehicle.

It is known in the prior art to provide portable storage cases for transporting bows and arrows. However, such cases do not facilitate the ready access to a bow in the event that the sportsman wants to deploy it in a nearly immediate manner. Consequently it is an object of the present invention to provide a caddy that allows for one or more bows to be securely stored within a vehicle while providing for ready access by the sportsman.

SUMMARY OF THE INVENTION

The bow caddy is a collapsible bow holder that fits over the back of any car or truck seat. It has an upper frame with two hooks that swivel outward and slide up and down to fit over the back of a car seat. The caddy also has a lower frame that is attached to the upper frame through means such as pivots or hinges. The upper frame rests against the front face of a seat back when the invention is attached to a seat. The hooks can be rotated along a generally-vertical axis so that their distal ends extend away from the upper frame and can be placed over the top of a seat back. Once placed in this manner, the hooks may be rotated inward or outward on their axes to fit snugly on the seat back. The hooks may have any dimension suitable for fastening over a seat back but typically will have about a 5-inch throat, a 5-inch down leg, and a 12-inch leg that slides up and down on the frame so as to be adjustable to a range of seat heights. The lower frame will rest against the seat portion in a generally horizontal attitude. The lower frame is bent up slightly at the front to elevate the front end off of the seat portion.

The upper and lower frames are covered with a material such as fabric. The fabric may have a camouflage pattern and be constructed in a manner so as to allow a user to change to materials of different colors to suit particular uses or preferences. The front of the material covering the lower frame is provided with one or more slots near the front edge to facilitate the storage of one or more bows. The caddy is thus particularly suitable for the storage of a compound bow. The bottom part of the caddy has a stiffener sewn into the back of the fabric to prevent the cam holder slot from tearing. This slot can be cut to a size to accommodate any size of bow cam. To store such a bow, the lower cam of the bow is inserted into a slot in the lower frame. The upper limb of the bow then rests against the upper frame. If desired, the upper limb of the bow may be secured to the upper frame of the caddy with a strap, bracket, or similar fastening means. Examples include an elastic strap secured by an plastic snap buckle or hook and loop fastener means. A brace may attached to the upper frame and can be pivoted out when in use and retracted for storage. The upper limb of a bow may be attached to the brace by means such as a strap or bracket at the end of the brace. Such braces are especially desirable for bows with long stabilizers to enable them to clear the face of the upper frame.

The material covering the frames may have elastic loops sewn in to facilitate the storage of gear such as flashlights. In addition, the caddy may have pockets in which to store items such as maps, cell phones, and radios. The pockets may be securable through means such as hook-and-loop strips. The bow caddy can also be equipped to store extra arrows by a support block to secure the unfletched end of an arrow in combination with either a strap or bracket to secure the middle portion of the shaft of the arrow.

The bow caddy can be easily collapsed for compact behind or under a car seat. To do this, the caddy is lifted off the car seat and the hooks are retracted so that they rest flush against the upper frame. The upper frame and lower frame are then folded together around the axis of the pivots or hinges so that they form a compact assembly. The assembly is then placed in a desired location.

The caddy can be made in various sizes to accommodate different numbers and sizes of bows. The standard version of the preferred embodiment can be used to store bows of a standard length but other embodiments could store a greater or lesser number of bows as well as bows of non-standard sizes. In addition, the bow caddy can be fitted with shoulder straps that attach to the top and sides of the frame with quick connect buckles that can be tightened to fit over a person's shoulders. Another belt can be fitted the bottom of the frame with buckle to serve as a waist belt. With such straps, the bow caddy can be used for hiking or for riding on small vehicles such bicycles and motorcycles.

DESCRIPTION OF THE PREFERRED EMBODIMENT

Figure 1:
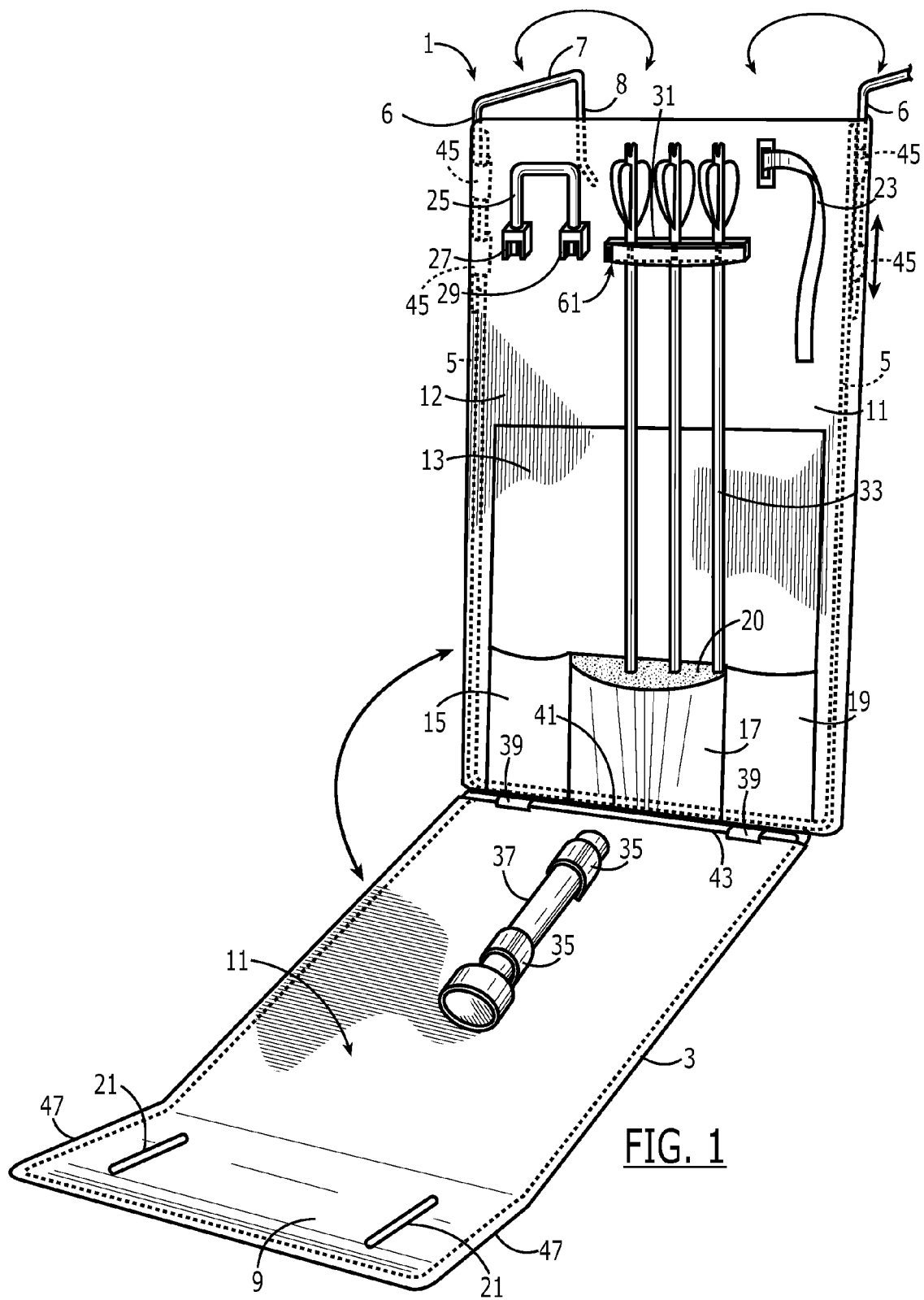
FIG. 1 is a front perspective view of the bow caddy.
Figure 2:
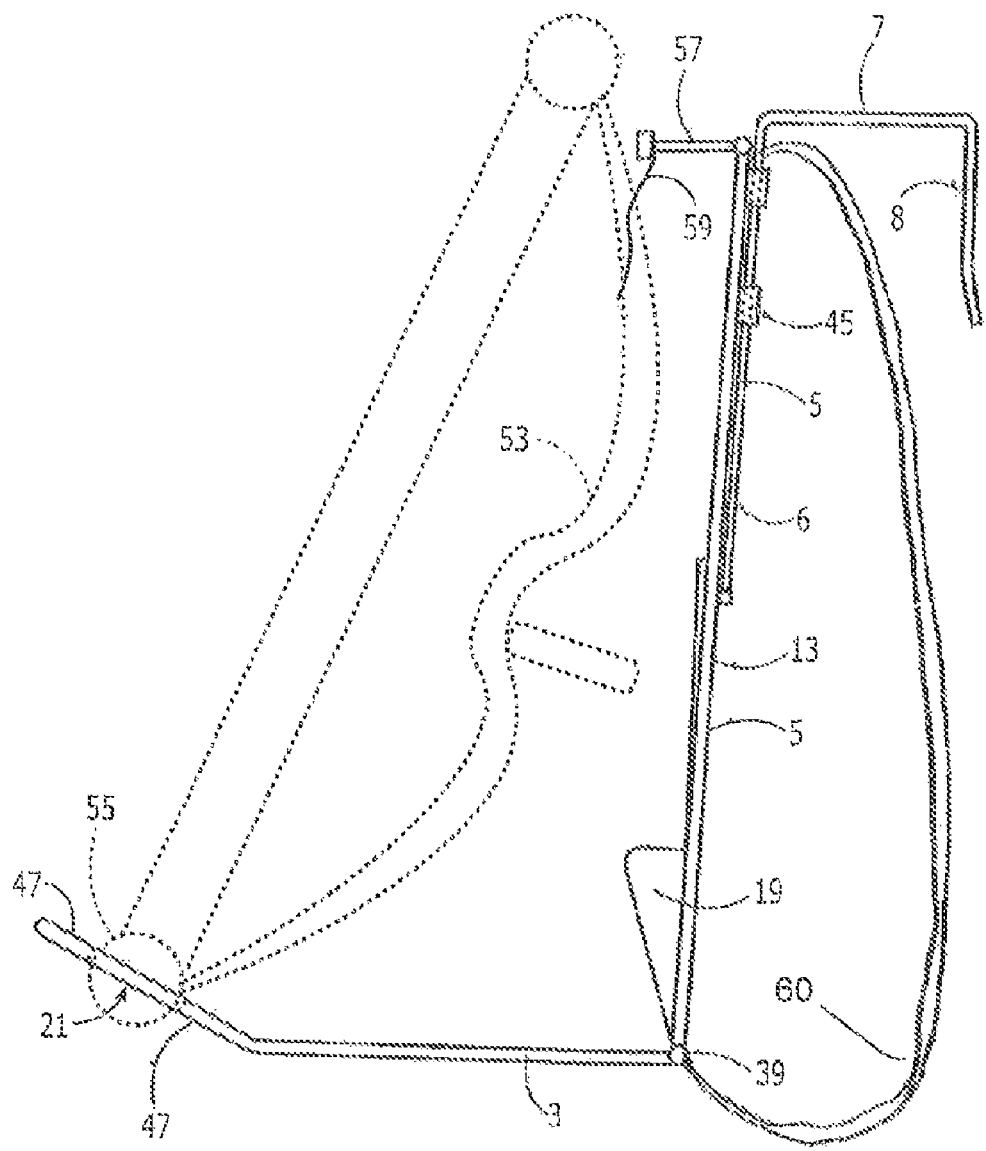
FIG. 2 is a side view of the bow caddy.

FIGS. 1 and 2 show the preferred embodiment a bow caddy 1 in its uncollapsed state. It has a lower frame 3 and an upper frame 5 that are attached to each other by pivots 39 such as hinges, clips, or encircling bands that allow the frames to pivotal around the axis formed where the proximal portion 43 of the lower frame 3 is attached to the proximal portion 41 of the upper frame 5.

Two hooks 7 are attached to the upper portion of the sides of upper frame 5 by bands 45 that encircle the upper frame 5 and the shanks 6 of the hooks 7 such that the hooks 7 are able to rotate around a vertical axis and slide up and down with respect to upper frame 5 so as to facilitate fitting over the back of a car seat 51. In an alternative embodiment not shown, the shanks 6 of such hooks 7 could be placed within a longitudinally-hollow space at the top end of frame 5 where they are capable of telescoping up and down and swiveling around a vertical axis. When the bow caddy 1 is deployed for use, the distal ends 8 of hooks 7 will rest against the back of a seat 51 to removably couple the bow caddy 1 to the back of said seat. Once placed in this manner, the hooks 7 may be rotated inward or outward to fit snugly on the seat back. The hooks may have any dimension suitable for fastening over a seat back but typically will have about a 5-inch throat, a 5-inch down leg, and a 12-inch leg that slides up and down on the upper frame 5 so as to be adjustable to a range of seat heights.

The lower frame 3 and upper frame 5 are covered with a material 11 such as fabric. The fabric may have a camouflage pattern and be constructed in a manner so as to allow a user to change to materials of different colors to suit particular uses or preferences. The front end 9 of the material 11 covering the lower frame is provided with one or more slots 21 near the front edge 9 to facilitate the storage of one or more bows 53. The slots 21 can be cut to a size to accommodate any size of bow cam 55. The part of the material 11 that fits over the front end 9 may be reinforced with a stiffener to strengthen the area surrounding the slots 21.

When the bow caddy 1 is deployed for use, the lower frame 3 will rest against the horizontal portion of the seat 51 in a generally horizontal attitude. The lower frame 3 is bent up slightly at the distal end 47 to elevate the front end 9 off of the seat and thus provide a space between the slot 21 and seat 51 for the cam 55 of a bow to reside without making contact with the seat 51.

To store a bow 53, the lower cam 55 of the bow is inserted into a slot 21 in the lower frame. The upper limb of the bow then rests against the material 11 covering the upper frame 5. If desired, the upper limb of the bow may be secured to with a fastening means 23 or 25 such as a strap or bracket. Examples include a strap 23 secured by a buckle or a hook and loop fastener, a strap 25 secured by a bringing the male end 27 and female end 29 of a snap buckle together, or a brace 57 with a securing strap 59. The brace 57 may attached to the upper frame 5 and can be pivoted out when in use and retracted for storage. Such braces 57 can also be used for the car seat versions and are especially desirable for bows 53 with long stabilizers to enable them to clear the face of the upper frame 5. It is noted that the means by which to secure the upper limb of a bow is not necessarily limited to straps. For example, brackets may suitably serve the same function. Such brackets include those in which the opening to the bracket is closed by an obstructing member once the bow limb is inserted into the bracket and also include those in which the brackets acts as a clip in which the limb is secured by friction or pressure exerted on the limb.

The bow caddy 1 can incorporate a strap 31 and a block 20 working in combination to enable the storage of extra arrows 33. The upper portions of the arrows 33 are held in place by the strap 31, which is preferably made of elastic and secured with a hook-and-loop strip 61, and the front end of the arrows are secured by the block 20 which is preferably made of closed cell foam. In the preferred embodiment, the block 20 is secured inside a pocket 17. Brackets in either clip or closure varieties could be used as an alternative to the strap 31.

The material 11 covering the frames 3 and 5 may also be fitted with elastic loops 35 that are sewn in to facilitate the storage of gear such as flashlights 37. In addition, the material 11 may have pockets 13, 15, and 19 to store items such as maps, cell phones, and radios. These pockets may be securable through means such as hook-and-loop strips. In the preferred embodiment, the portion 12 of the material 11 is free of pockets to reduce the possibility that items stored in pockets could make contact with a bow 53.

The bow caddy 1 can be collapsed for convenient storage when not in use. To do this, the bow caddy 1 is lifted off the car seat and the hooks 7 are rotatably retracted so that they rest flush against the material 11 covering the upper frame 5. The upper frame 5 and lower frame 3 are then folded around the axis of the pivots 39 that the bow caddy 1 forms a compact assembly. The assembly can then be placed in a desired location such as behind or beneath the seat 51.

The bow caddy 1 can be made in various sizes to accommodate different numbers and sizes of bows. The preferred embodiment as described above can be used to store two bows of a standard length. The general dimensions of the preferred embodiment are 22-inches high, 16-inches deep when the lower frame 3 is extended, and 12-inches wide. Another embodiment for carrying three bows could be 22-inches high, 24-inches wide, and 16-inches deep at the bottom. This embodiment would have three slots cut on the bottom for three bows. Additional frame supports on the back may be used to space the hooks at intervals of about 12-inches apart to facilitate fit over a range of seat sizes and types. Embodiments used to hold bows longer than the standard compound hunting bow would have a height of 22 inches and a depth of 24 inches at the bottom to accommodate longer bows. The bow caddy 1 can also be embodied to hold shorter-than-standard bows by setting the depth of the bottom frame accordingly.

The bow caddy could also be adapted to enable it to be worn on a person's back by fitting it with shoulder straps 60 that attach to the upper frame 5 or the material 11 surrounding the upper frame. Such attachments could be done with quick connect buckles that can be tightened to fit over a person's shoulders. Another strap could be attached near the proximal portion 41 of the of the upper frame 5 with buckle for use as a waist belt. Additional straps could also be provided for holding gear such as a small tent and sleeping bag. This embodiment could also incorporate a flip-up brace to maintain a distance between the bows and the person's back.

While the bow caddy has been shown with particularity with respect to the preferred embodiment, it will be understood by those skilled in the art that various alterations in form, detail, construction, and dimensions my be made without departing from the spirit and scope of the invention.

I claim:

1. A portable bow rack for transporting a bow comprising:
   an upstanding frame assembly, constructed of an upper frame supporting a first fabric panel, having a top end, bottom end, front face, and back face, with said first fabric panel having means by which to secure the limb of a bow to said front face, and with said upstanding frame assembly further having inverted hook-shaped brackets capable of being removably coupled to a seat back;
   a platform assembly constructed of a lower frame supporting a second fabric panel, having a proximal end, distal end, and a top face, with said second fabric panel having an open slot positioned within said distal end for receiving the bottom cam of a compound bow;
   whereby the distal end of the platform assembly is set an upward angle to the remainder of the platform assembly; and
   whereby the proximal end of the platform assembly is pivotally coupled to the bottom end of the upstanding frame assembly and selectively movable between a first configuration generally perpendicular to said upstanding frame assembly and a second configuration generally parallel to said upstanding frame assembly.

2. The portable bow rack of claim 1 wherein the inverted hook-shaped brackets are adjustably positionable with respect to the top end and may be selectively rotated between a first configuration that is generally perpendicular to said back face and a second configuration that is generally parallel to said back face.

3. The portable bow rack of claim 1 wherein said means by which to secure the upper limb of a bow to said front face comprises a strap and said first and second fabric panels are selectively removable.

4. The portable bow rack of claim 1 wherein said means by which to secure the upper limb of a bow to said front face comprises a bracket and said first and second fabric panels are selectively removable.

5. The portable bow rack of claim 1 further comprising a strap and block combination configured to be removably coupled with an arrow.

6. The portable bow rack of claim 1 further comprising a bracket and block combination configured to be removably coupled with an arrow.

7. The portable bow rack of claim 1 further comprising storage pockets.

8. The portable bow rack of claim 1 wherein said means by which to secure the upper limb of a bow to said front face comprises a pivotable brace having a securing strap.

9. The portable bow rack of claim 1 further comprising shoulder straps.

* * * * *